United States Patent [19]

Bagley

[11] Patent Number: 5,991,852

[45] Date of Patent: Nov. 23, 1999

[54] CACHE RAM USING A SECONDARY CONTROLLER AND SWITCHING CIRCUIT AND IMPROVED CHASSIS ARRANGEMENT

[75] Inventor: Robert Craig Bagley, San Jose, Calif.

[73] Assignee: MTI Technology Corporation, Anaheim, Calif.

[21] Appl. No.: 08/738,766

[22] Filed: Oct. 28, 1996

[51] Int. Cl.[6] ............................ G06F 13/00; G06F 11/16; H05K 7/02

[52] U.S. Cl. .................................. 711/112; 714/6; 714/7; 361/685; 361/796; 711/119; 711/162; 711/114

[58] Field of Search .................................. 711/112, 113, 711/114, 161, 162, 119; 395/182.04, 182.05, 183.18; 361/684, 685, 796, 788; 714/6, 7, 42

[56] References Cited

U.S. PATENT DOCUMENTS

| | | | |
|---|---|---|---|
| 5,212,785 | 5/1993 | Powers et al. .............................. | 714/5 |
| 5,432,922 | 7/1995 | Polyzois et al. ........................ | 711/162 |
| 5,437,022 | 7/1995 | Beardsley et al. .......................... | 714/6 |
| 5,469,335 | 11/1995 | Kluth et al. .............................. | 361/800 |
| 5,535,381 | 7/1996 | Kopper ................................... | 711/162 |
| 5,557,186 | 9/1996 | McMurtrey, Sr. et al. ............. | 318/626 |
| 5,579,204 | 11/1996 | Nelson et al. ........................... | 361/685 |
| 5,617,530 | 4/1997 | Stallmo et al. .......................... | 711/114 |
| 5,619,642 | 4/1997 | Nielson et al. .............................. | 714/6 |
| 5,640,606 | 6/1997 | Glenn, Jr. et al. ........................ | 710/62 |
| 5,652,697 | 7/1997 | Le .......................................... | 361/788 |
| 5,680,295 | 10/1997 | Le et al. ................................. | 361/788 |
| 5,734,549 | 3/1998 | Oura ....................................... | 361/685 |
| 5,777,845 | 7/1998 | Krum et al. ............................ | 361/685 |
| 5,787,243 | 7/1998 | Stiffler ..................................... | 714/13 |
| 5,828,243 | 10/1998 | Bagley ..................................... | 327/99 |

*Primary Examiner*—Glenn Gossage
*Attorney, Agent, or Firm*—Townsend and Townsend and Crew LLP

[57] ABSTRACT

A memory system including a main memory such as a cache memory and a shadow or back-up cache memory in conjunction with a write cache is disclosed. The shadow memory is coupled to the same data bus as the main memory and is written to simultaneously. Thus, there is no latency between writing to the main memory and writing to the shadow memory. Redundancy is provided for by having a switching circuit which allows control of the shadow memory to be transferred to a second controller upon failure of a first controller. A unique layout arrangement for a RAID (redundant array of independent disks) chassis is also described in which back-to-back circuit boards are mounted in the center of the chassis and a main bus on one board becomes the shadow bus on the other board, providing a mirror arrangement for the circuit boards.

1 Claim, 6 Drawing Sheets ically sensitive data. For example, in a RAID
CACHE RAM USING A SECONDARY CONTROLLER AND SWITCHING CIRCUIT AND IMPROVED CHASSIS ARRANGEMENT

BACKGROUND OF THE INVENTION

The present invention relates to the use of shadow or backup memory, and in particular to such use in connection with a write cache used with a disk drive memory system.

Shadow memories are used as a backup memory in case the main memory which is being shadowed fails. There are unique requirements for shadow memory in a redundant system. Redundant systems will typically have two controllers, each with its own memory, with both being isolated from each other and having separate power supplies so that one can operate in case the power or other aspects of the other fail. In such an environment, the shadow memory for the first controller is the second controller's memory, which is mounted on the circuit board containing the second controller, and powered by the power supply for the second controller. Thus, in the event the first controller fails, or the first controller's power supply fails, the data will be shadowed in the separate circuit board and can be accessed and written to the disks from that shadow memory.

Such a redundant system decreases the available bandwidth for write operations, since the data must be first written to the memory associated with the first controller, and then subsequently written to the shadow memory on the second controller's circuit board. Random access memory (RAM) disk is often used for the shadow memory in order to provide further integrity. A RAM disk is a solid state disk which has its own batteries, and thus is not dependent upon any power supply in the event of power supply failure. A RAM disk is fast, a requirement for a shadow cache memory, but is also very expensive.

In one type of operation, a write back operation, a host computer will send a write command to the memory subsystem, and will wait for an acknowledgement that data has been written to disk as requested before proceeding to other operations. Because of the time required to access disk drives, some memory systems store the write data in a cache memory, and then send back the acknowledgement to the host system even though the data has not been written to the disk yet. This allows the host to be more efficient, but, since it is well known that the integrity of the data in a cache is less than the integrity of data on a disk, this data is backed up in a shadow RAM to give the required security. As can be seen by the example recited above, due to the need to write into the cache memory first, and then into the shadow RAM, additional latency is required before the write back acknowledgement signal can be returned to the host.

Accordingly, there is a need for a shadow RAM with reduced latency and costs.

SUMMARY OF THE INVENTION

The present invention provides a shadow memory which is coupled to the same data bus as the main memory and is written to simultaneously. Thus, there is no latency between writing to the main memory and writing to the shadow memory. Redundancy is provided for by having a switching circuit which allows control of the shadow memory to be transferred to a second controller.

A system according to the present invention can use the shadow memory for only certain address ranges corresponding to particularly sensitive data. For example, in a RAID (Redundant Array of Independent Disks) system or other disk system, it may be desirable to increase speed by reporting back to a host processor that write data has been written to the disk, although it is only in cache, waiting to be written. Thus, this data can be shadowed to provide a security level similar to that on a disk. In the event of a loss of data in the main memory, the shadow memory has the write data available for completion of the write to the disk. The shadow memory is provided in a separate power domain, and can be separately controlled by a separate controller, in case either the controller or first power domain are the sources of the loss of the main memory data.

A second aspect of the invention provides a unique wiring arrangement for a RAID chassis in which back-to-back circuit boards are mounted in the center of the chassis. A main bus on one board becomes the shadow bus on the other board. Each circuit board originates and terminates its own drive interface busses, providing isolation for fault-tolerance, maintenance, and power management. This arrangement also reduces the necessary bus length, and provides a mirror arrangement for the circuit boards, allowing either to be plugged into the other's slot. The back-to-back arrangement allows a shadow memory, in one option, to be placed on another circuit board, but still be close enough across the backplane to receive the same data as the main memory without undue signal line delay.

For a fuller understanding of the nature and advantages of the invention, reference should be made to the ensuing detailed description taken in conjunction with the accompanying drawings.

DESCRIPTION OF THE PREFERRED EMBODIMENT

Figure 1:
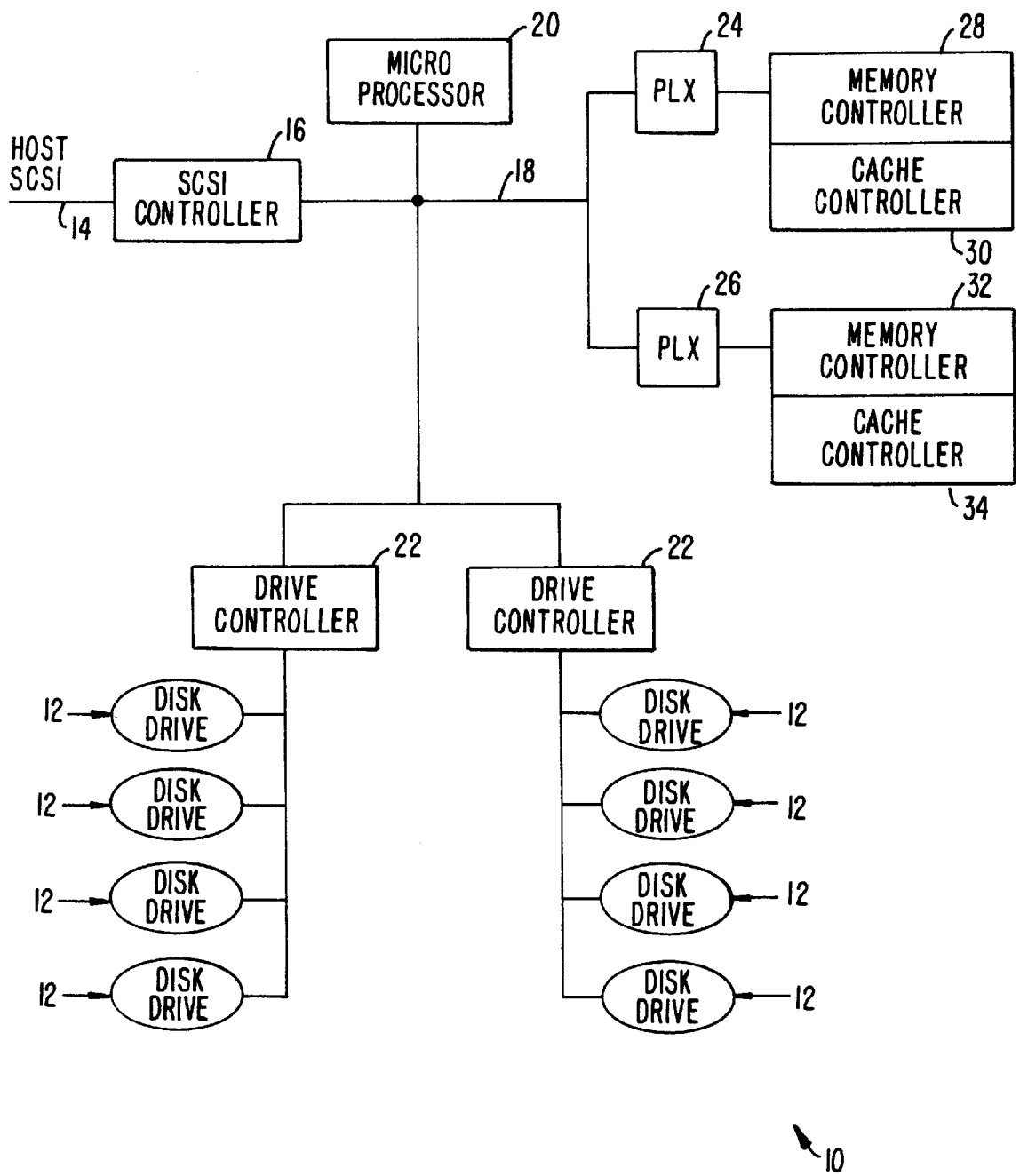
FIG. 1 is a block diagram of a prior art disk drive memory subsystem.

FIG. 1 illustrates a prior art disk drive memory subsystem 10 controlling a plurality of disk drives 12. A host small computer system interface (SCSI) bus 14 connects to a SCSI controller 16. This in turn connects to a peripheral component interconnect (PCI) bus 18 which is operated under the control of a microprocessor 20. A pair of drive controllers 22 provide an interconnection to the disk drives 12.

When data is transferred to and from the host, it first goes to PCI to local bus bridge interface circuits, such as those manufactured by PLX Technologies, shown as PLX interfaces 24 and 26. Interface 24 provides a connection to a memory controller 28 and its associated cache memory 30. Data to be written to the disk is first stored in the cache memory 30, and subsequently written to the disk drives when the PCI bus is no longer being used for a host communication. A second memory controller 32 and cache memory 34 are also provided, connected through interface 26. During a write back operation, the host will send data through SCSI controller 16, which is then routed through one of the PLX interfaces to the cache memory 30 or 34. After the data is written, the data is backed up in a shadow memory. The shadow memory may be a RAM disk (not shown). Alternately, cache memory 34 may be used as the shadow for cache memory 30. After this backup operation is performed, an acknowledgement signal is sent back to the host indicating that the write has been completed. This fools the host into thinking that the data has been written onto the disk. The data can then subsequently be written onto the disk drives without holding up the host computer.

Figure 2:
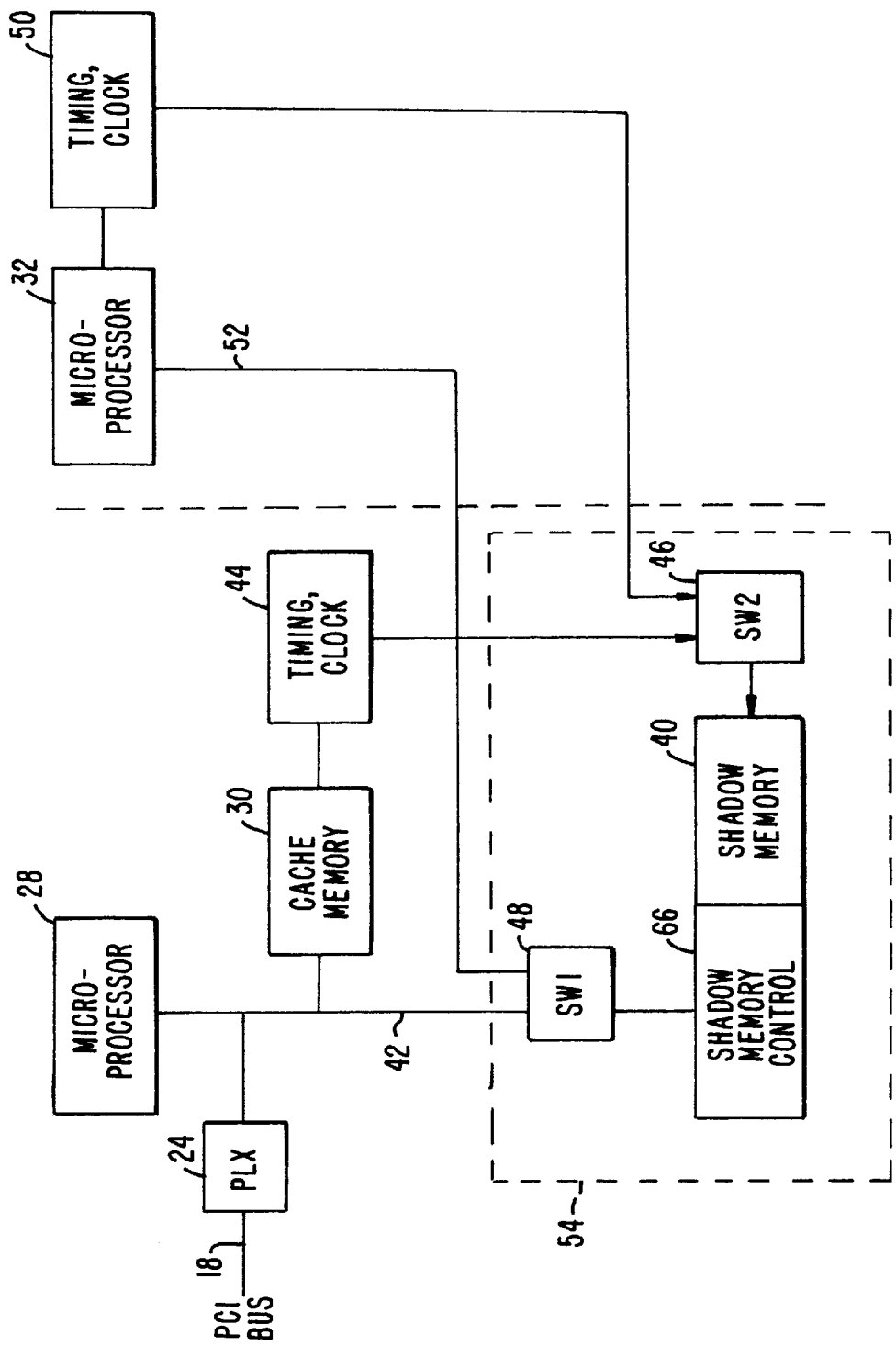
FIG. 2 is a block diagram of a memory subsystem according to the present invention.

FIG. 2 is a block diagram of an embodiment of a system according to the present invention. The system is shown as connecting to PCI bus 18 (the source of write data) through PLX 24, with the microprocessor 28 and cache memory 30 connected to PLX 24. However, in this embodiment, a shadow memory 40 and a shadow memory control circuit 66 are added, connected to the same data bus 42 as cache memory 30. In one embodiment, data bus 42 is a multiplexed data/address bus. Bus 42 can also contain control signals, such as the read/write signals, etc., provided from microprocessor 28. A first switch (SW1) 48 couples bus 42 to shadow memory 40 and shadow memory control circuit 66. Both cache memory 30 and shadow memory 40 are provided with any necessary refresh and clock timing by timing and clock circuit 44. These signals are provided to shadow memory 40 and shadow memory control circuit 66 through a second switch (SW2) 46.

In operation, during a write to cache 30, the same data is simultaneously written to shadow memory 40. Thus, on completion of the write operation, a write back acknowledgement can be sent to the host without any added latency at all.

The fail-safe redundancy is provided through a second microprocessor 32 with its own timing and clocking circuit 50. These are connected to shadow memory 40 and shadow memory control circuit 66 through switches 48 and 46, respectively, with microprocessor 32 having its own data bus 52. Thus, upon a failure of either microprocessor 28 or cache memory 30, or associated circuitry, the second microprocessor 32 can take over operation of shadow memory 40. In addition, shadow memory 40 and shadow memory control circuit 66 along with switches 48 and 46 are connected to a separate power supply in a separate power grid area, or domain, 54. In one embodiment, even though shadow memory 40 and shadow memory control circuit 66 are on the same circuit board as cache memory 30, it is connected to a different power supply, thus providing isolation from any power supply failure for the cache memory 30. The isolation circuit consisting of the two switches 48 and 46 allows a shadow memory to be isolated from any failure of other circuitry connected to the first memory controller 28 and data bus 42.

The switching interface to the secondary controller can, in one embodiment, be a read-only memory interface. Since this interface will only be used in the event of a failure of the first memory, the second controller will not operate out of the shadow memory on an ongoing basis, but simply copy its contents into its own memory or write the data to disk. Accordingly, there is no need to provide a full read/write interface. The present invention can be implemented in a paired arrangement, where a first controller can take over the shadow memory of a second controller, and vice versa. Alternately, N controllers and associated memories could be arranged as primary and secondary controllers, without them necessarily being in matched pairs.

Figure 3:
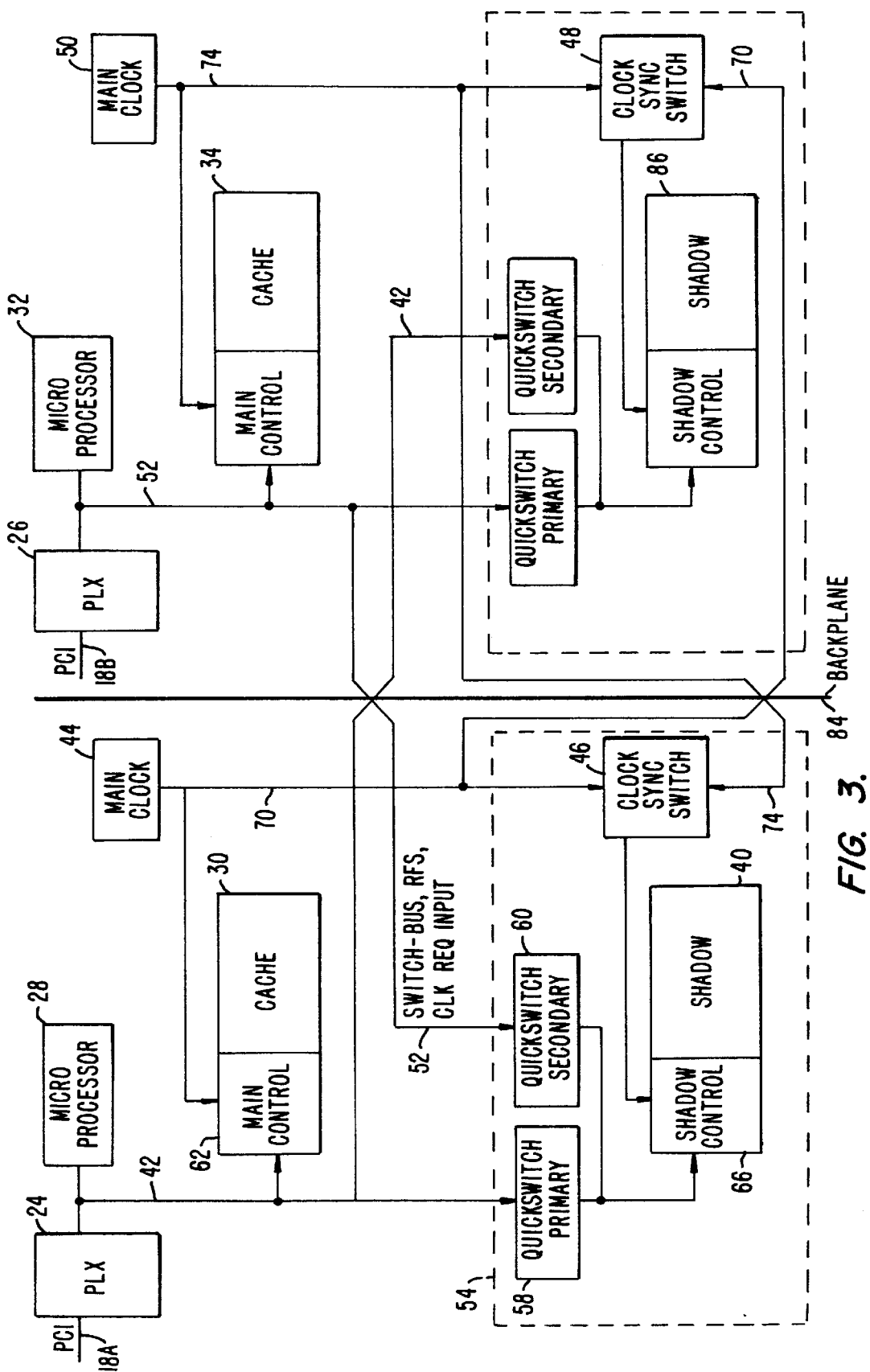
FIG. 3 is a more detailed diagram of the memory subsystem of FIG. 2.

FIG. 3 shows a more detailed drawing of the embodiment of the invention set forth in FIG. 2. As can be seen, shadow memory 40 is connected to data bus 42 through a quick switch 58. A second quick switch 60 connects memory 40 to data bus 52 of secondary microprocessor 32. The quick switches are fast transitioning metal oxide semiconductor field effect transistors (MOSFETs) which allow a quick transition from one bus to the other. The quick switches are controlled by a control line from shadow memory control circuit 66.

A main control circuit 62 provides the control inputs to main cache memory 30. The two control circuits 62 and 66 are synchronized. A clock signal on line 70 from clock 44 is provided to auxiliary control (shadow memory control circuit) 66 through a clock synchronization switch 46.

Figure 4:
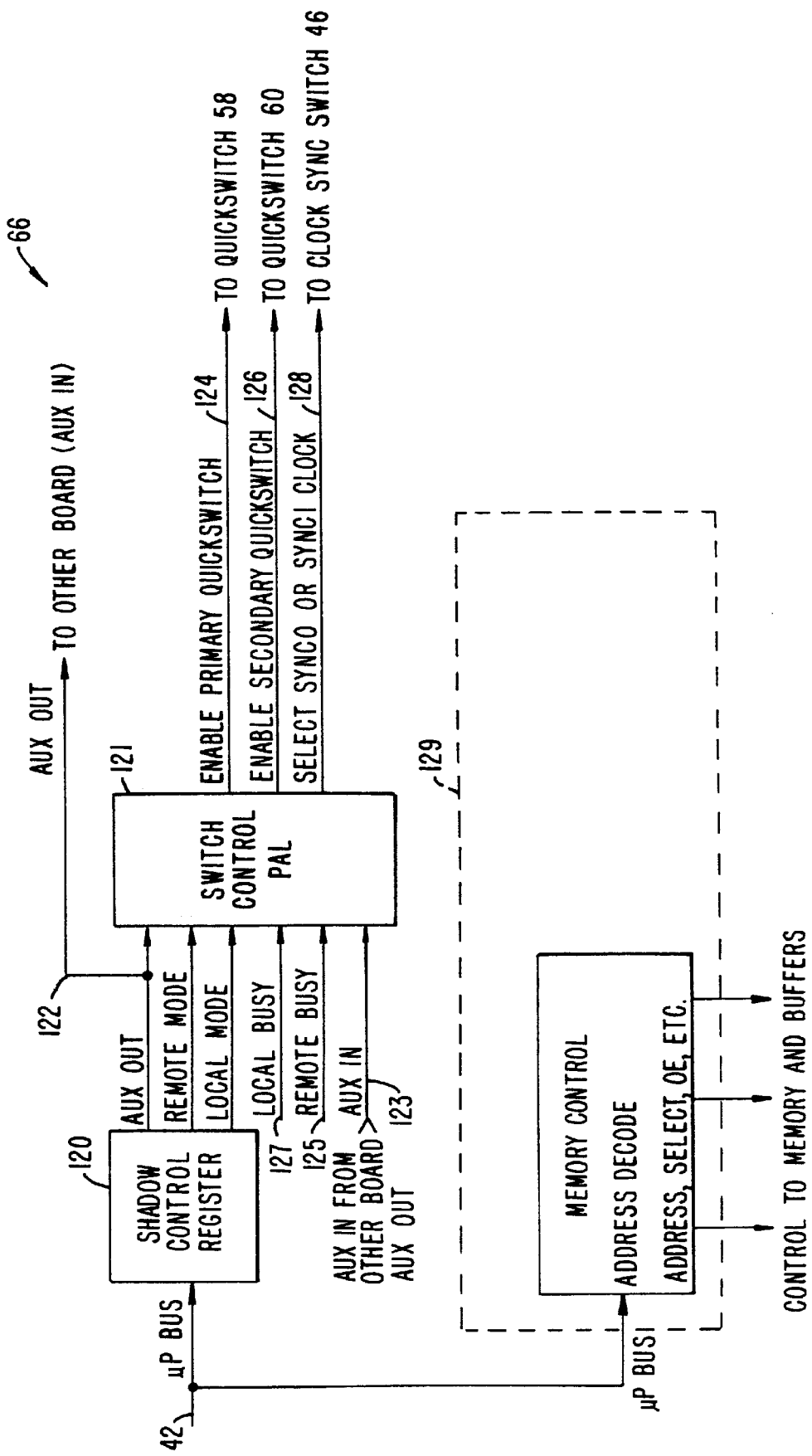
FIG. 4 is a diagram of the shadow memory control circuit of FIG. 3.

The shadow memory control circuit is shown in more detail in FIG. 4. The control logic consists of two main parts. The first part is the actual memory controller 129 itself. The memory control logic is the same as the main memory control circuit (62 of FIG. 3) and will vary with the actual memory configuration used. If static random access memory (SRAM) is used, it will consist of address latch logic, chip enables, output enables, interleave control logic, address counters for bursting of more than one transfer per address cycle, and data buffer control logic. If dynamic random access memory (DRAM) is used, additional signals will be included, such as Row Address Strobes, Column Address Strobes, latches and buffers for row and column addresses, and related timing logic for refresh, read, and write access.

The second part of the control logic is unique to the shadow memory control circuit (66 of FIG. 3) and consists of a shadow memory control register 120 and a switch control programmable array logic (PAL) 121. Shadow memory control register 120 is written by the microprocessor (28 of FIG. 3) with the mode of operation selected by the user via the microprocessor bus (42 of FIG. 3). This will either be LOCAL MODE or REMOTE MODE, it cannot be both. This determines which microprocessor (28 or 32) will control the switching of the shadow memory physically located on the board.

When the onboard shadow memory (40 of FIG. 3) is set to LOCAL MODE, it will shadow the main cache memory (30 of FIG. 3) locally and switching will be controlled by the microprocessor (32 of FIG. 3) on the other (or another) Printed Circuit Board or controller. For example, when shadow memory 40 is set to LOCAL MODE, it will shadow main cache memory 30 and switching will be controlled by microprocessor 32. Switching of the shadow memory between the two microprocessors is then accomplished by the other microprocessor 32 issuing AUX OUT 122 from its shadow control register 120. When AUX OUT 122 is issued by the other microprocessor 32, that signal is routed through the backplane to the local switch control PAL 121, becoming AUX IN 123. When the switch control PAL 121 sees AUX IN 123 active, it negates the ENABLE PRIMARY QUICKSWITCH 124 signal immediately and waits until REMOTE BUSY 125 is inactive to drive the ENABLE SECONDARY QUICKSWITCH signal 126. REMOTE BUSY 125 indicates when the remote microprocessor bus 52 (FIG. 3) is active. The shadow memory 40 is now attached to the remote microprocessor 32.

By doing a switch-over during the inactive state, any possible glitches won't affect data on the bus. Clock synchronization can start before the actual switch-over, so that the clock will be synchronized at the switch-over time.

When the onboard shadow memory (40 of FIG. 3) is set to REMOTE MODE, it will shadow the main cache memory (34 of FIG. 3) remotely and switching will be controlled by microprocessor 28. For example, when shadow memory 40 is set to REMOTE MODE, it will shadow the main cache memory 34 and switching will be controlled by microprocessor 32. Switching of the shadow is then accomplished by the other microprocessor 28 issuing AUX OUT 122 from its shadow control register 120. When AUX OUT 122 is issued by microprocessor 28, that signal is routed to the local switch control PAL 121. When switch control PAL 121 sees AUX OUT 122 active, it negates the ENABLE SECONDARY QUICKSWITCH signal 126 immediately and waits until LOCAL BUSY 127 is inactive to drive the ENABLE PRIMARY QUICKSWITCH signal 124. LOCAL BUSY indicates when the microprocessor bus 42 is active. Shadow memory 40 is now attached to the local microprocessor 28.

As illustrated by the notations on the main and shadow cache memories of FIG. 3, the different memories can be addressed with different system addresses. In main cache memory 30, the first set of addresses beginning with 8 are indicated as read/write addresses (RW), indicating that microprocessor 28 can use these addresses in this range for any purpose. For sensitive data that is to be shadowed, that data will be addressed in the range beginning with A. All writes of data to range A will be written simultaneously to cache memory 30 and shadow memory. In local mode, the shadow memory is 40, in remote mode it is 86. Thus, data in the 8 range will not be shadowed, while data in the A range will be. Yet another address range starting with B is shown in shadow memory 40. This is the address range in which secondary controller (microprocessor) 32 will address shadow memory 40 to read the data upon a fail-over. The B range allows secondary controller 32 to distinguish this address space from its own main memory space (8 range) and shadowed memory space (A range).

Switch 46 optionally may detect any failure of the clock on line 70 and cause it to switch to a secondary controller clock 50 if there is any failure. A detailed description of such a clock synchronization switch 46 is providing in copending application Ser. No. 08/740,105, filed concurrently herewith entitled, "METHOD FOR DETECTING CLOCK FAILURE AND SWITCHING TO BACKUP CLOCK", incorporated herein by reference, now U.S. Pat. No. 5,828,243.

Shadow RAM 40 and its surrounding circuitry are provided in a separate power domain, with the circuits having a separate power domain being indicated by box 54. This power domain could be connected to the same power supply used for secondary microprocessor 32 and secondary cache 34, or another power supply could be used.

As can be seen from FIG. 3, secondary microprocessor 32 has circuitry duplicating that of a circuit card containing microprocessor 28. The two circuits are connected to the same back plane bus 84. In the alternate configuration (remote mode), the shadow RAMs could be reversed, with the shadow RAM 86 on the second circuit board shadowing cache memory 30, and shadow RAM 40 shadowing cache memory 34. Simultaneous writing is still possible since they are connected via the same backplane. As will be appreciated by those of ordinary skill in the art, a number of aspects of the embodiment of FIG. 3 could be varied without departing from the invention. For example, the quick switches 58 and 60 could be transceivers instead. Cache RAM 40 could either be DRAM of any sort, or SRAM.

The present invention could also be applied to other than a disk drive memory system. Other memories which store critical data, such as redundant central processing unit (CPU) data, could take advantage of a shadow memory system according to the present invention. In such an embodiment, the environment in which the invention shown in FIG. 2 would be used would be different from that of FIG. 1. Alternately, two or more computer systems could shadow each other (as opposed to just memory systems).

The present invention preferably has hardware implemented circuitry for detecting a clock failure (clock sync switch circuit 46) or a refresh generator failure (auxiliary control circuit 66). Upon a detection of a failure of either of these, a switch-over to the secondary microprocessor 32 is automatically done, in synchronization. Other failures could be detected in other ways, using software monitoring, for instance. An example of a redundant system wherein two peers monitor each other is set forth in U.S. Pat. No. 5,212,785, assigned to the same assignee as the present invention.

Upon a failure detected either in hardware or software of the system of primary microprocessor 28, secondary microprocessor 32 will cause the data in shadow RAM 40 to be read by appropriate control signals through quick switch 60 and auxiliary control 66. Because the redundancy of the system has been eliminated in such a failure situation, it is also no longer desirable to send an acknowledgement for a write back operation if the data has not actually been written to the disk. Accordingly, until the failure can be repaired, subsequent writes will not be acknowledged until they are actually written onto the disk drives themselves.

The present invention may also provide a dual port SRAM (not shown) connected between first data bus 42 and second data bus 52. This SRAM allows the passing of messages between first microprocessor 28 and second microprocessor 32. These messages can indicate the status of the microprocessors, indicating whether they are functioning properly, about to fail, etc.

Figure 5:
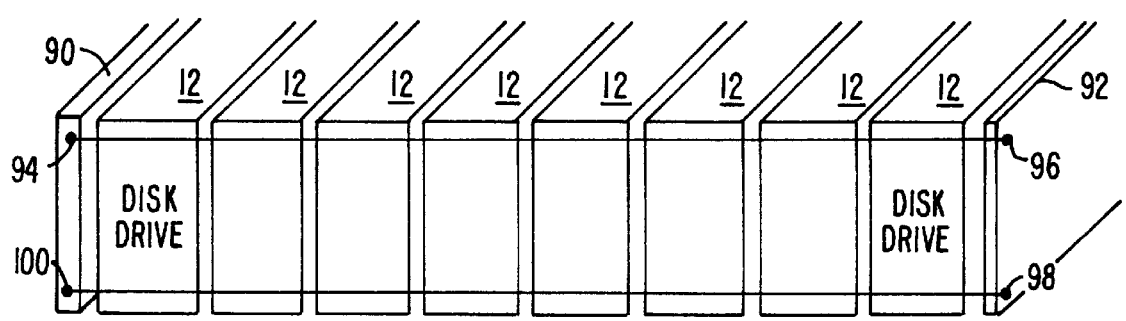
FIG. 5 is a diagram of a prior art disk drive bus configuration.

FIG. 5 illustrates a prior art disk drive configuration including multiple disk drives 12 in a chassis. On either end of the chassis housing are circuit boards 90 and 92. In a typical configuration, a first control bus, SCSI bus, etc., originates on board 90 at point 94, passes through all of the disk drives 12, and terminates on board 92 at point 96. A second bus originates on board 92 at point 98, and after passing through disk drives 12, terminates on circuit board 90 at point 100.

Figure 6:
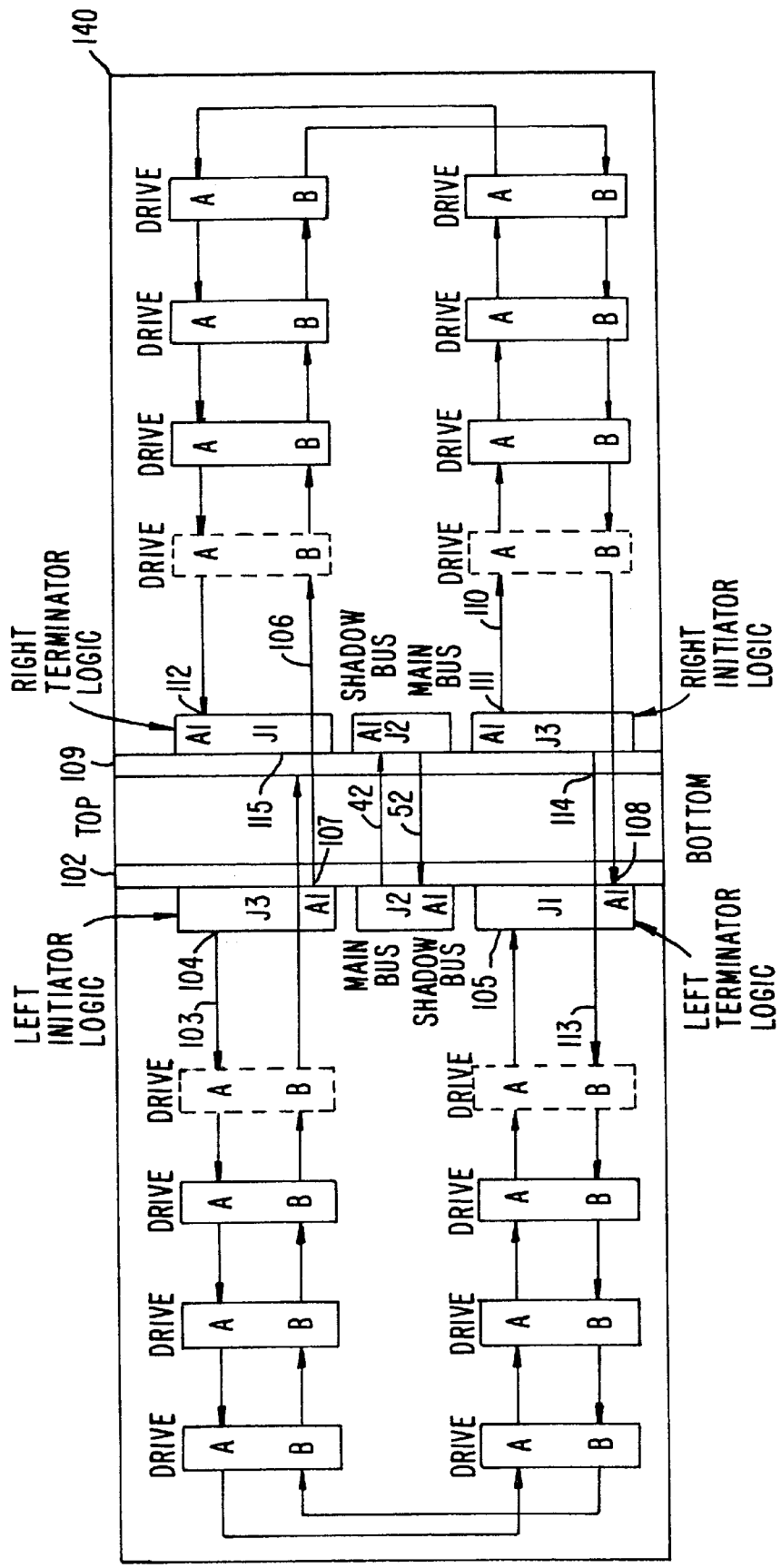
FIG. 6 is a diagram of a disk drive bus system according to the present invention.

FIG. 6 illustrates an arrangement according to the present invention in which back-to-back circuit boards, left controller 102, and right controller 109, are mounted in the center of a chassis (housing) 140, or substantially centrally in the chassis. As shown, a first microprocessor bus 42, and a second microprocessor bus 52 connect the main bus of each controller to the shadow bus of the other controller. Microprocessor bus 42 originates as the main bus on controller 102 and becomes the shadow bus on controller 109. Similarly, microprocessor bus 52 originates as the main bus on controller 109 and becomes the shadow bus on controller 102. Optimum performance is obtained by minimizing the lengths of busses 42 and 52, therefore the distance between controllers 102 and 109 should be minimized. Controllers 102 and 109 are identical circuit boards at the connectors, and are mounted in the chassis back-to-back.

Additionally shown in FIG. 6 are four individual drive interface busses, 103, 106, 110, 113. Interface bus 103 originates from controller 102 in connector J3 at point 104 and connects to each of the drives shown and terminates in controller 102, connector J1 at point 105. A second drive interface bus, 106 originates from controller 102 in connector J3 at point 107 and connects to each of the drives shown and terminates in controller 102, connector J1 at point 108.

The second controller 109 has two drive interface busses, 113 and 100 which connect in a similar fashion. Drive interface bus, 113 originates from controller 109 in connector J3 at point 114 and connects to each of the drives shown and terminates in controller 109, connector J1 at point 115. A second drive interface bus, 110 originates from controller 109 in connecter J3 at point 111 and connects to each of the drives shown and terminates in controller 109, connector J1 at point 112. As demonstrated, each controller circuit board originates and terminates its own drive interface busses. This configuration provides isolation for fault tolerance, maintenance, and power management. Each of the controllers, 102 and 109 can control all drives shown in FIG. 6.

The pin connections to the circuit boards are preferably arranged symmetrically, such that either circuit board could be pulled out, turned 180 degrees, and used to replace the other circuit board. Thus, a single circuit board design can be used, which is interchangeable. This would require symmetrical arrangement of power, ground, and other pins as well as the main and shadow busses. When rotated, the shadow bus simply becomes the main bus, and vice versa.

By using this arrangement which allows the boards to be back-to-back, as opposed to on opposite sides of the backplane as in the prior art, a shadow memory can be placed on a different board from its main memory in an alternate embodiment. Since the signal distance over the backplane is very small, the shadow memory can still be written to simultaneously with the main memory on the other circuit board in this embodiment.

As will be appreciated by those of ordinary skill in the art, the present invention may be embodied in other specific forms without departing from the spirit or essential characteristics thereof. For example, in an alternate embodiment, a single circuit board could be used for both controllers with separate power domains on the circuit board. Accordingly, the foregoing embodiments are illustrative only, and the scope of the invention is set forth in the following claims.

What is claimed is:

1. A system comprising:

a main memory;

a first controller;

a second controller; a data bus connected to said main memory and said first controller;

a shadow memory coupled to said data bus;

a shadow memory control circuit configured, responsive to control signals from one of said first and second controllers, to generate memory control signals to enable data to be written simultaneously to said main memory and said shadow memory with the same data from said data bus;

a switching circuit configured to selectively couple one of said first and second controllers to said shadow memory control circuit;

a disk drive housing for holding a plurality of disk drives;

a first circuit board containing said first controller and said main memory and shadow memory, said first circuit board being mounted in said disk drive housing;

a second circuit board containing said second controller, said second circuit board being mounted adjacent to, and back-to-back with, said first circuit board substantially in the center of said disk drive housing;

a plurality of disk drives arranged in first and second rows on a first side of said circuit boards in said disk drive housing, and third and fourth rows on a second side of said circuit boards in said disk drive housing;

a primary bus originating on said first circuit board, having connections to said first and second rows of disk drives, and terminating on said first circuit board; and a secondary bus originating on said first circuit board, having connections to said third and fourth rows of disks drives and terminating on said first circuit board.

* * * * *